J. P. DALSING.
PLOW.
APPLICATION FILED OCT. 9, 1912.
1,102,326.
Patented July 7, 1914.
2 SHEETS—SHEET 1.
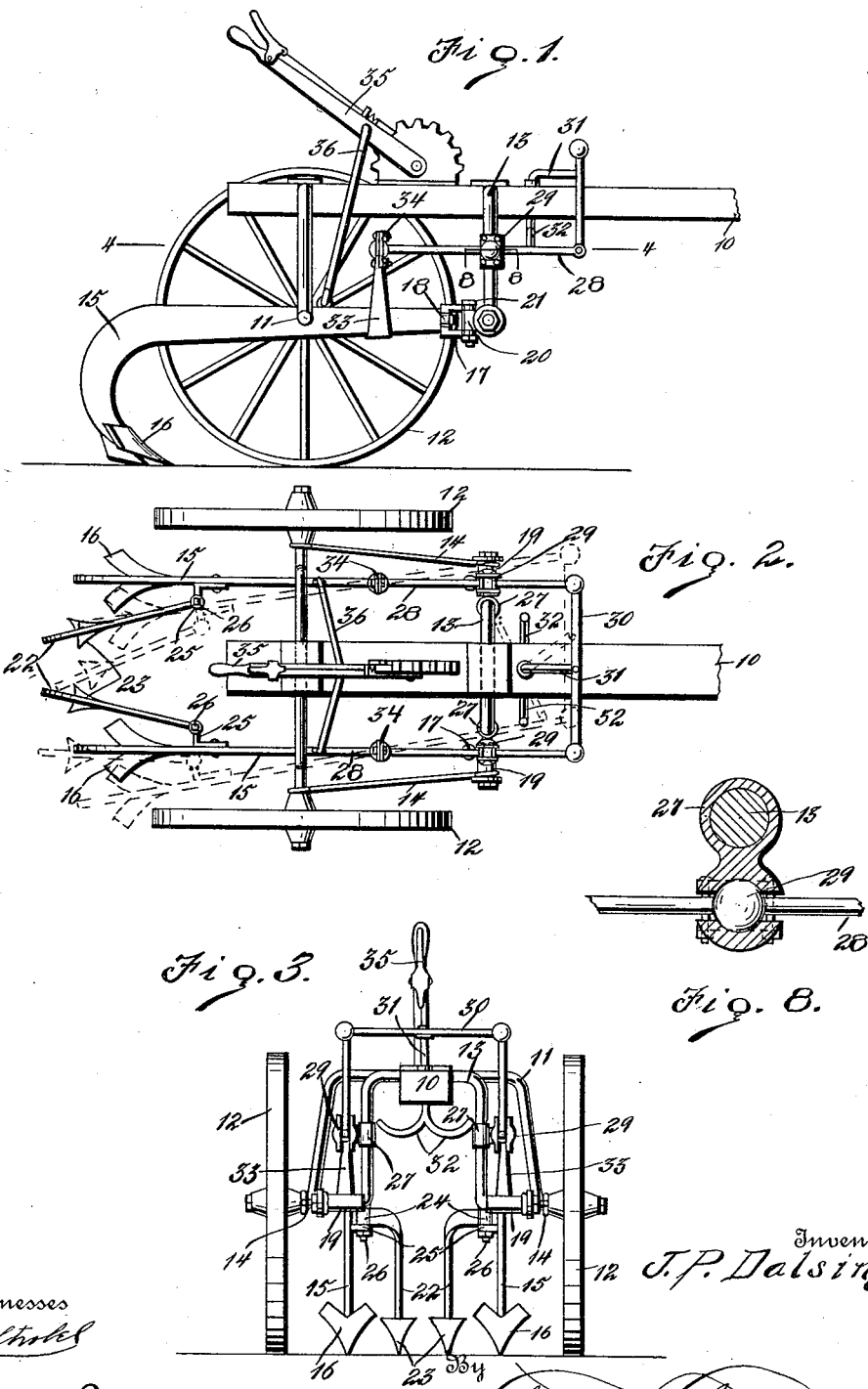

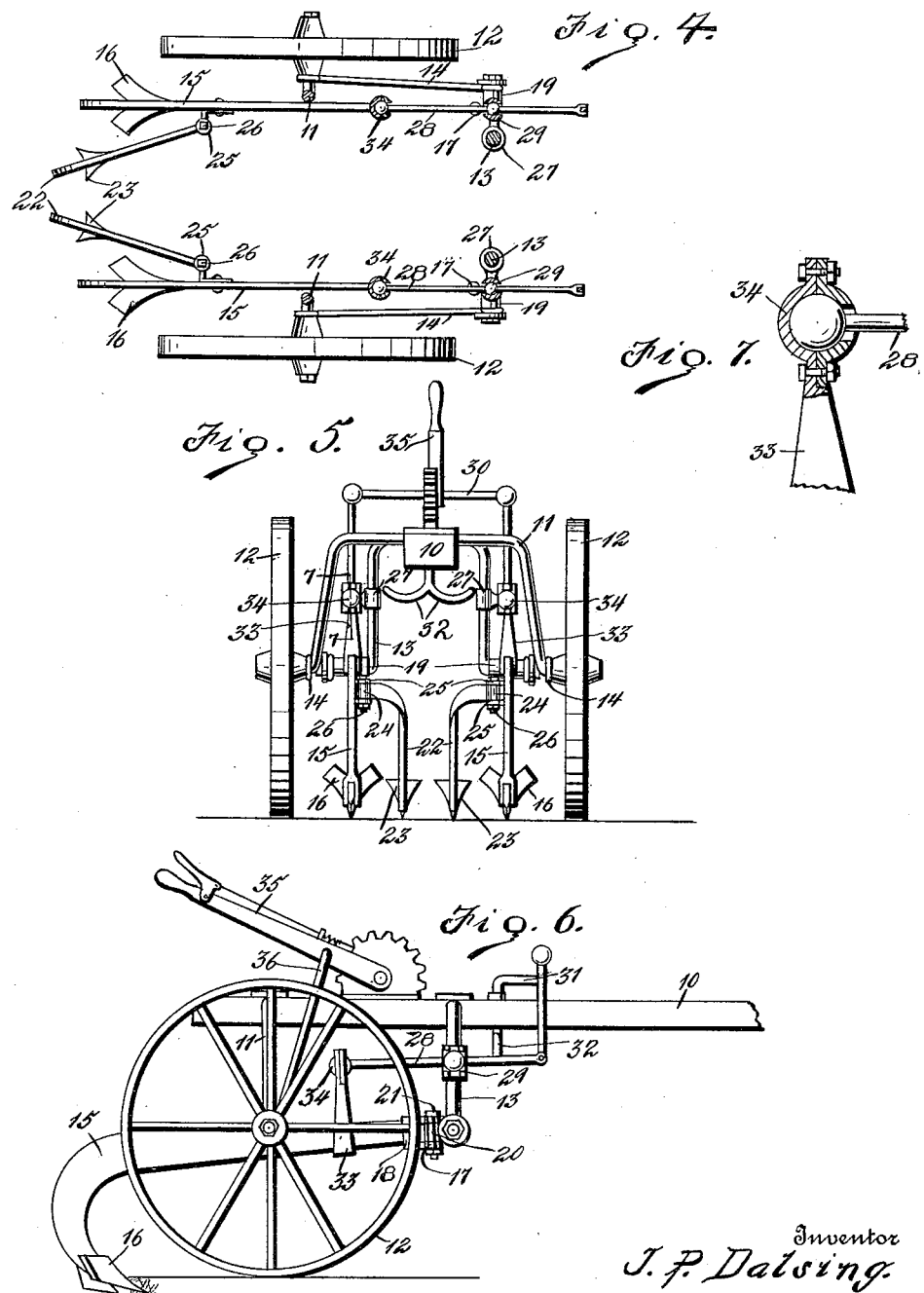

UNITED STATES PATENT OFFICE.

JOHN P. DALSING, OF ONEIDA, KANSAS.

PLOW.

1,102,326.  Specification of Letters Patent.  Patented July 7, 1914.

Application filed October 9, 1912. Serial No. 724,831.

*To all whom it may concern:*

Be it known that I, John P. Dalsing, a citizen of the United States, residing at Oneida, in the county of Nemaha, State of Kansas, have invented certain new and useful Improvements in Plows; and I do hereby declare the following to be a full, clear, and exact description of the invention, such as will enable others skilled in the art to which it appertains to make and use the same.

This invention relates to cultivators, and has for an object to provide a device of this character having novel means for swinging the cultivator blades laterally in and out between rows of plants so that the ground may be cultivated between the rows.

With the above object in view, the invention consists of certain novel details of construction and combination of parts hereinafter fully described and claimed, it being understood that various modifications may be made in the minor details of construction within the scope of the appended claim.

In the accompanying drawings forming part of this specification, Figure 1 is a side elevation of the cultivator with the near wheel removed. Fig. 2 is a plan view of the cultivator showing the blades in full lines in one position and in dotted lines in an adjusted position. Fig. 3 is a front elevation of the cultivator. Fig. 4 is a horizontal sectional view taken on the line 4—4 Fig. 1. Fig. 5 is a rear elevation of the cultivator. Fig. 6 is a side elevation of the cultivator showing the blades lowered. Fig. 7 is a fragmentary vertical sectional view taken on the line 7—7 Fig. 5. Fig. 8 is a fragmentary sectional view taken on the line 8—8 Fig. 1.

Referring now to the drawings, in which like characters of reference designate similar parts, 10 designates a draft tongue which is equipped at the rear end with an arched axle 11, that is equipped with ground wheels 12. Disposed on the tongue in advance of the axle is a bowed hanger 13, and this hanger is rigidly connected with the axle by means of links 14 arranged on opposite sides of the tongue and connected terminally to the hanger and the axle.

Two cultivator beams 15 are employed, each beam being equipped at the rear ends with a blade 16, and being equipped at the front end with a vertically disposed coupling 17 which is swivelly attached to the beam as shown at 18. Upon each end of the hanger is loosely mounted a coupling 19 which is equipped with a sleeve 20 through which and the adjacent coupling 17 a vertically disposed pivot bolt 21 is passed. The cultivator beam may thus be swung laterally on the vertical pivot pin 21 and may also swivel on the coupling 17 to maintain the blade in level engagement with the soil.

Each beam is equipped on the inner side with a supplemental cultivator beam 22 which is provided on the lower end with a blade 23 and which is provided on the forward end with an eye 24 through which and a similar eye 25 carried by the main beam a bolt 26 is passed.

For simultaneously swinging the main beams laterally, bracket arms 27 are secured to the hanger 13, and to these bracket arms are centrally pivoted links 28, connection between the links and bracket arm being made by ball and socket joints 29. The front ends of the links are connected by a rod 30 which in turn is centrally connected to a crank shaft 31 which is journaled in the tongue 10 and is equipped at the lower end with laterally disposed pedals 32 against which the feet of the operator may be placed to actuate the shaft 31 and simultaneously swing the links 28 on the bracket arm. To each main beam is fixed an upright arm 33 which is connected to the rear end of the related link 28 by means of a ball and socket joint 34.

By now referring to Fig. 2, it will be seen that upon the links 28 being swung simultaneously in one direction, the main beams 15 are swung simultaneously in the opposite direction. The operator may thus manipulate the main beams to cause the cultivator blades to move laterally between the rows of plants and thus thoroughly cultivate the soil between the rows.

For raising the blades when it is desired to transport the cultivator from place to place, an operating lever 35 is mounted upon the tongue 10 and carries the usual notched segment and latch for holding the lever in adjusted positions, the lever being equipped further with rods 36 which are connected to the main beams 15. Upon the lever being shoved forwardly, the main beams are simultaneously lifted and the blades raised from the ground. The couplings 19 pivoting on the hanger 13 in the meantime, and the links 28 also pivoting on the ball and socket joints 29 while the crank shaft 31 slides downwardly in its opening in the tongue, to permit of this movement of the main beam.

What is claimed is:

A gang plow including a main frame, rigid hanger arms depending from the sides of said frame, a wheeled axle carried by said frame in rear of said arms, horizontally swinging links having ball and socket connections intermediate the ends with the intermediate portions of said arms, a shift lever connected to the front ends of said links for swinging said links on said connections, plows having the beams pivoted at the front ends to the lower ends of said hanger arms and upright members rigidly connected to said beams and pivotally connected at the upper ends to the rear ends of said links, actuation of said shift lever serving to swing said plows horizontally in the same direction and oppositely to the direction of said shift lever.

In testimony whereof, I affix my signature, in the presence of two witnesses.

JOHN P. DALSING.

Witnesses:
GEO. T. RONNEBAUM,
JOSEPH RONNEBAUM.